United States Patent [19]

Kump et al.

[11] Patent Number: 5,762,654

[45] Date of Patent: Jun. 9, 1998

[54] METHOD FOR MAKING LEAD-ACID GRIDS AND CELLS AND BATTERIES USING SUCH GRIDS

[75] Inventors: William H. Kump; Rosalind Batson, both of St. Paul, Minn.

[73] Assignee: GNB Technologies, Inc., Mendota Heights, Minn.

[21] Appl. No.: 728,245

[22] Filed: Oct. 8, 1996

[51] Int. Cl.⁶ .............................. H01M 4/82; B23P 13/00
[52] U.S. Cl. ........................................ 29/623.5; 29/2
[58] Field of Search ........................ 29/623.5, 2, 6.1

[56] References Cited

U.S. PATENT DOCUMENTS

| | | | |
|---|---|---|---|
| 1,918,947 | 7/1933 | Williams . | |
| 1,982,485 | 11/1934 | Salmon et al. | 136/36 |
| 2,909,586 | 10/1959 | Hagspihl | 136/28 |
| 3,069,486 | 12/1962 | Solomon et al. | 136/30 |
| 3,881,952 | 5/1975 | Wheadon et al. | 136/26 |
| 3,891,459 | 6/1975 | McCartney, Jr. et al. | 136/26 |
| 4,284,693 | 8/1981 | McDowell | 29/2 X |
| 4,303,747 | 12/1981 | Bender | 429/161 |
| 4,486,517 | 12/1984 | Bender | 429/149 |
| 5,401,278 | 3/1995 | Yasuda et al. | 29/2 |
| 5,601,953 | 2/1997 | Schenk | 429/211 X |
| 5,630,263 | 5/1997 | Shimano | 29/2 |

*Primary Examiner*—Anthony Skapars
*Attorney, Agent, or Firm*—Leydig, Voit & Mayer, Ltd.

[57] ABSTRACT

A continuous process for making lead-acid grids and plates for a family of cells and batteries requiring grids with a particular plate width and varying plate heights comprises expanding and slitting a continuous strip to provide the desired width and a grid having at least one side frame bar and an interconnected expanded mesh, pasting the expanded mesh with active material, determining the grid height desired and then cutting the expanded mesh strip transversely of the direction of travel to provide plates of the desired height while forming a plate lug from one side frame bar.

12 Claims, 3 Drawing Sheets

METHOD FOR MAKING LEAD-ACID GRIDS AND CELLS AND BATTERIES USING SUCH GRIDS

FIELD OF THE INVENTION

This invention relates to lead-acid cells and batteries and, more particularly, to grids and plates used in making such cells and batteries and to the method of making such grids and plates.

BACKGROUND OF THE INVENTION

The advantages that are provided by sealed lead-acid cells and batteries in comparison to conventional, flooded lead-acid batteries are substantial and varied. Sealed lead-acid technology does offer substantial benefits by eliminating maintenance (e.g., cell watering), environmental (e.g., expensive waste treatment systems and airborne acid mist), and safety (e.g., acid burns) concerns. Such cells and batteries offer the possibility of operating with virtually no liberation of hydrogen and oxygen during continuous float charging. Well designed VRLA ("valve-regulated lead-acid") cells and batteries with good float charge control and thermal balance during operation could result in a three to ten year service life with very minimal maintenance costs.

It is thus not surprising that sealed lead-acid cells and batteries are widely used in commerce today for various applications. In stationary battery applications, the sealed lead-acid cells and batteries provide stand-by power in the event of a power failure. For this type of application, such cells and batteries are maintained at a full state-of-charge and in a ready-to-use condition, typically by floating at a constant preset voltage. Stationary batteries are used for standby or operational power in a wide variety of applications, including, by way of illustration, telecommunications, utilities, for emergency lighting in commercial buildings, as stand-by power for cable television systems, and in uninterruptible power supplies for computer back-up power and the like.

Other applications in which sealed lead-acid cells and batteries may be used involve a variety of motive power applications in which an array of cells or batteries provides the motive power for vehicles ranging from Class 1 to Class 3 trucks, various automated guided vehicles, mining vehicles and also railroad locomotives.

The performance requirements for motive-power vehicles are quite different from the performance requirements for stationary power sources. In stationary power applications, the depth of discharge in service is relatively shallow, and the number of discharges is smaller, as most batteries are in float service. In direct contrast, motive power applications require a relatively deep depth of discharge to be achieved on a continuous cycling basis over a period of time. Indeed, a common requirement for Class 1-3 trucks is that, in an 8-hour shift, the cell or battery assembly must be capable of delivering an 80% depth of discharge and that performance is required for 300 cycles per year with a useful service life under those conditions of 4 or 5 years.

The widely varying requirements for these many applications has presented substantial problems to manufacturers of sealed lead-acid cells and batteries. This has been further complicated in that, for motive-power applications, the compartment for the motive-power source has most often been designed for the size of batteries using conventional flooded lead-acid batteries.

All of these concerns, and additional concerns, have presented an extremely challenging environment for sealed-lead acid cell and battery manufacturers. This environment has resulted in, to a large extent, custom designs which satisfy particular applications.

The grids used generally have been made by gravity casting techniques. It has, however, long been recognized that gravity casting techniques, which are semi-continuous at best, can cause several production problems. In the first place, gravity casting techniques are subject to various problems which result in scrap as well as lack of product consistency and the like. These problems include operator error; wide variation in grid wire thickness and hence overall weight due to mold coating variations and irregularities; substantial material handling in production and difficulty in automating such processes and the accompanying inconsistencies due to human error and the like.

A further complicating factor is the need to provide grids of various sizes so that the capacity and other electrical performance requirements for an individual cell for a particular application can be satisfied. One approach utilized has been to provide a series of grids having essentially constant width while varying the height of an individual grid and the number of plates used in a particular cell to achieve a variety of capacity and other electrical performance requirements. Such grids have been made by utilizing gravity casting and a number of molds.

Potentially, the use of any continuous process like continuous grid casting or other continuous expanded metal fabrication techniques to make battery grids should be capable of minimizing, if not eliminating, one or more of the problems associated with gravity casting techniques. Some of these same considerations are of concern in making lead-acid grids for flooded conventional batteries such as automotive batteries. There has been accordingly substantial interest and effort directed toward the use of such techniques over the years insofar as making grids for automotive-type applications. This effort has resulted in what is believed to be the widespread use of various continuous, expanded metal fabrication processes for making SLI ("starting, lighting and ignition") negative battery grids.

Various continuous processes for making grids from cast and rolled strip have been proposed. One particularly desirable approach utilizes a directly cast strip, i.e., a continuous strip that is directly cast from molten lead alloy into the thickness desired for making the grids. The casting process thus does not include any cold rolling or other reduction in the thickness of the strip from the cast thickness to the thickness desired for making the grid. Equipment for making a suitable directly cast alloy continuous strip for molten lead alloy is commercially available (Cominco Ltd., Toronto, Canada). In this regard, U.S. Pat. No. 4,315,357 to Laurie et al. illustrates, in general, the method and apparatus for making the expanded mesh strip necessary for making a continuously cast grid.

Other continuous processes for making wrought grids are known. All of such processes include expanding and slitting steps and often include cold rolling a continuous strip to the thickness desired before such expanding and slitting steps are carried out.

Yet, despite the well known shortcomings of gravity casting and the knowledge of continuous processes for making grids for automotive applications, it is not believed that a suitable continuous process has been developed for making grids and plates for industrial cell/battery applications. There accordingly is a need which exists for grids of a design suitable for industrial lead-acid cells and batteries, but which can be made in a continuous fashion.

It is accordingly a principal object of the present invention to provide a commercially viable process for making grids suitable for lead-acid cells for industrial cell/battery applications using continuous grid manufacturing methods.

A further object provides a continuous process for making grids which can achieve grids of varying sizes so as to accommodate the electrical performance requirements of a wide variety of applications.

Other objects and advantages of the present invention will become apparent as the following description proceeds. While the present invention will be described herein principally in connection with making grids and plates for VRLA sealed lead-acid cells and batteries, it should be appreciated that this invention is equally applicable to making grids and plates for flooded electrolyte cells and batteries designed for use in industrial battery applications. Such applications are known, and some have been discussed herein. Indeed, the present invention is useful for making grids and plates for any desired lead acid cell/battery application.

SUMMARY OF THE INVENTION

The present invention is, in general, predicated on the discovery of a continuous method of making grids, and ultimately plates, for lead-acid cells and batteries. By forming such grids and plates with a frame bar on at least one side of the grid with grid mesh connected to the side frame bar or bars, and a lug forming a part of one of the side frame bars, a continuous method of production is achieved. In this fashion, grids of this type with varying height to width aspect ratios, while providing an essentially constant grid width, can be made in a continuous process. This gives the ability to satisfy the varying end-use application requirements by using plates with the selected height to width aspect ratio. Using just a single plate production line thus still allows production of an entire range of lead-acid cells and batteries.

DETAILED DESCRIPTION OF THE INVENTION

Figure 1:
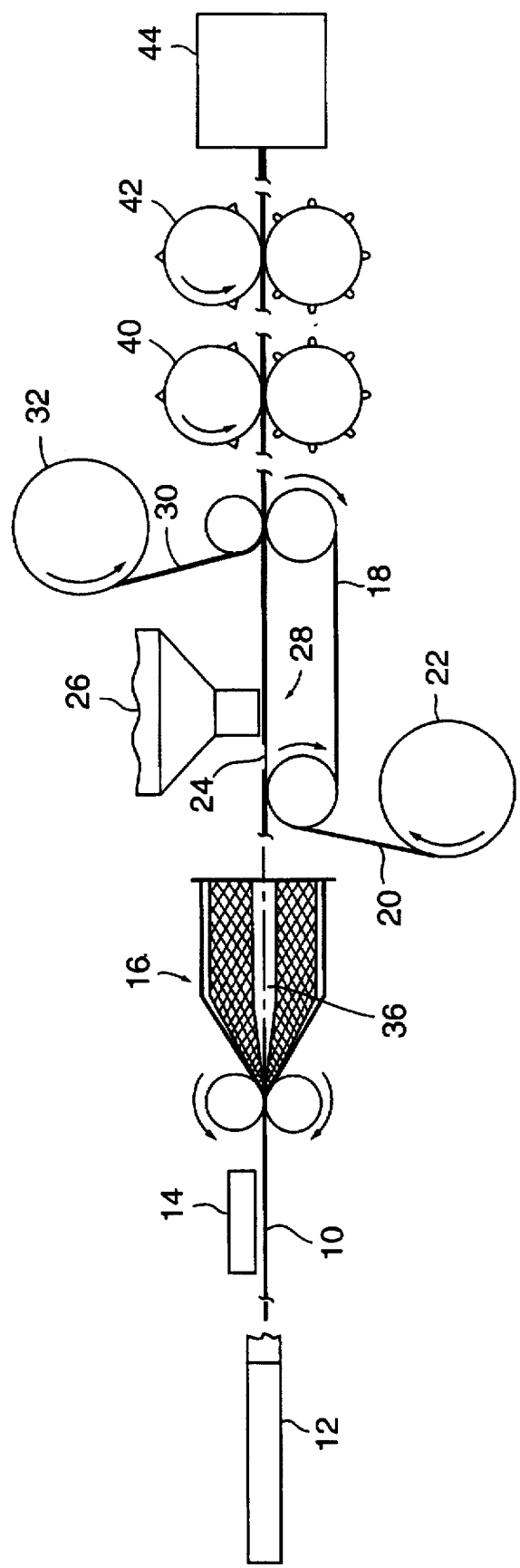
FIG. 1 is a schematic view of the preferred continuous method for making lead-acid grids and plates in accordance with this invention.

FIG. 1 schematically depicts the various steps and equipment utilized in a preferred embodiment of making the grids and plates of the present invention. In general, the equipment utilized comprises a continuous expanded cell battery plate production line. In utilizing this line, the strip is in the form of coils. Strip 10 from a coil 12 stacked in the horizontal position is continuously fed into the grid expander line. Successive coils can be processed without rethreading by using a strip welder 14 which bonds the end of one coil to the beginning of the next coil.

In the grid expander section, the strip 10 is converted into a grid mesh of the desired size and pattern. In general, the rotary expansion, shown generally at 16, involves an expander tooling module having an assembly of circular cutters mounted on three shafts which cut and preform the strip 10 into an expandable pattern. Center and outside grid protrusions are also cut into the strip which allows engagement by three sets of silent chains in the expansion section. The outside silent chains diverge, causing the mesh to expand away from the center, forming a diamond-like pattern. As the mesh is expanded, the outside edges elongate more than the center. A stretcher pulls the center portion forward to match the outside edge.

Grid mesh flatteners and coining rollers may be employed to roll the grid expanded mesh to the desired thickness (i.e., flattening out any high spots). Edge trimmers may be used to remove any edges of the mesh so as to provide desired dimensional uniformity and eliminate any ragged or protruding portions.

Any alloys suitable for lead-acid cells and batteries may be used, and the particular alloys employed do not form a part of the present invention. As may be appreciated, the alloys used for a VRLA sealed cell may differ from those utilized for a flooded electrolyte cell or battery. Many such alloys are known for the positive and negative grids and may be employed.

As may be appreciated, the extent of expansion will determine the width of an individual grid and may be varied as desired. Likewise, the width of the edge strips, which become the side frame bar or bars, can be varied as desired.

The thus-formed grid mesh strip is then continuously moved onto a conveyor belt 18, and active material paste is applied. In the embodiment illustrated, a bottom absorbent paper layer 20 from a roll 22 is positioned between strip 10 and the surface of the conveyer belt 24. Thus, active material paste from paste hopper 26 is applied to the desired areas of strip 10 in the pasting zone shown generally at 28, desirably restricting the paste application to at least minimize or eliminate paste being applied to the center strip 36. As may be appreciated, center strip 36 ultimately forms the plate lug/side frame bar for the side-by-side plates being made, as will be discussed hereinafter. This pasting may be accomplished by any means desired as is known. Suitable paste-applying apparatus for expanded mesh is known and may be used. As an illustrative example, a suitable paste-applying apparatus is AutoMac 170 Paster (MAC Engineering, Benton Harbor, Mich.). Suitable positive and negative active material paste and density therefor as well as suitable absorbent materials are known and may be used.

After exiting from the pasting zone, in this illustrative embodiment, an optional step positions a top absorbent layer of paper or the like on the upper pasted surface of the pasted plates so as to shroud the pasted plates, the pasted plates being thus sandwiched between the top and bottom absorbent layers. In this fashion, this optional step may lessen any environmental concerns due to lead dust or the like getting into the air. As shown in FIG. 1, a top absorbent paper layer 30 unwinds from roll 32 and is spread onto the upper surface of the pasted strip 10.

Figure 2:
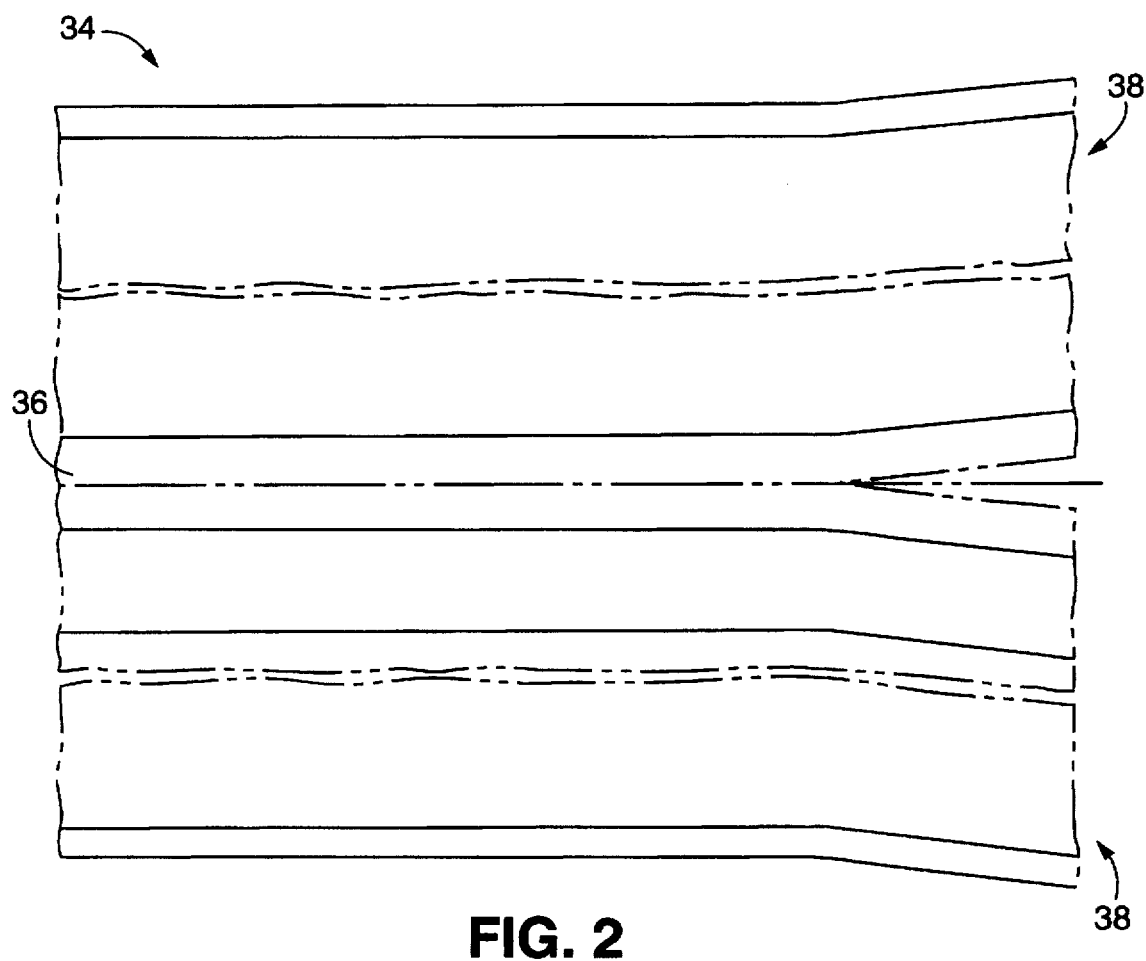
FIG. 2 is a partial top view of the strips pasted with active material and showing the separation into side-by-side strips.

Pursuant to the present invention, the thus-pasted strip 10 is then cut into individual plates having the desired plate height. As shown in the illustrative process of FIG. 1, which shows making side-by-side plates, the next step involves separating the pasted strip 10, as shown generally at 34, into side-by-side continuous strips (FIG. 2). As more fully shown in FIG. 2, cutting the cojoint center frame bar (shown generally at 36) defines side-by-side pasted strips 38. This step defines the width dimension of the individual grids and plates. This separation step can be carried out by any suitable apparatus, such as, for example, by a rotary cutter as indicated at 40 in FIG. 1.

Then, as is shown in FIG. 1, a plate parting step, as indicated at 42, is carried out. The plate parting and lug forming step can be carried out by using a rotary cutting die or punch, or the like, suitable equipment being known. This step defines the height of the plate and forms the grid lug. As may be appreciated, the spacing and timing of the plate parting step in accordance with the present invention should be adjustable so that the height to width ratio of an individual plate can be varied as is necessary to provide plates having a predetermined variation in per plate capacity. This may be conveniently determined as number of Ampere Hours (AH) capacity per positive plate; and, as an illustrative example, for some sealed lead-acid applications, that AH capacity can be rated at positive plate sizes of 58 AH up to 210 AH and even higher.

Then, since the size and AH capacity of the individual plate can be varied as desired, the desired total cell capacity is then achieved by using the number of plates necessary to achieve that desired total cell capacity. This provides a highly versatile approach that satisfies a wide variety of end-use requirements while obtaining the advantages derived from using a continuous process.

Typically, further processing includes, as in the illustrative preferred embodiment, flash drying followed by paste curing, as shown in FIG. 1 at 44. This curing step can be carried out before plate parting. However, it will be generally preferred to first carry out the plate parting step because the paper present, when used, on either side of the pasted grid mesh should prevent the cutters used for plate cutting from removing too much paste; and, also, the active material is soft and less susceptible to cutter damage prior to curing.

The divided individual plates go through a rapidly moving conveyor that is pasted. The plates are heated to remove a small amount of surface moisture. Typically, 15–20% moisture from the plates is removed in this step. The flash-dried plates may then be stacked in plate trays for further paste curing.

Curing can be carried out by any of the many known techniques. Additionally, further optional processing steps that could be carried out, if desired, include force drying of such cured plates to reduce the free lead content and moisture to lower levels.

Figure 3:
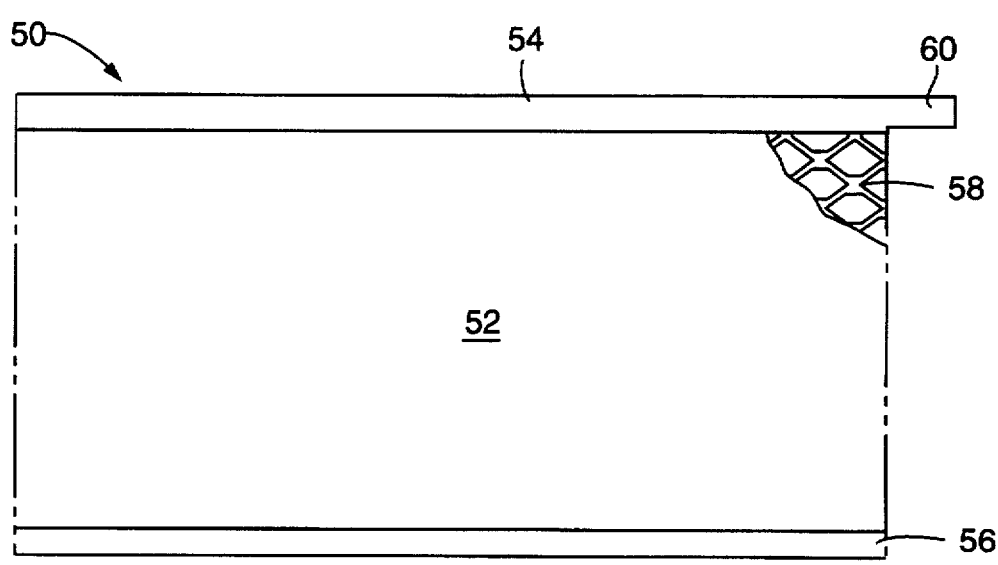
FIG. 3 is a partial side elevation view of a plate made using the process of FIG. 1 with part of the active material being removed to show the structure of the grid.

FIG. 3 illustrates an individual plate 50 having active material 52 thereon. Part of the active material 52 has been broken away to show the underlying grid which comprises side frame bars 54 and 56 which define the width of the grid and extend from the bottom of the grid to the top. Expanded mesh 58 interconnects side frame bars 54 and 56. Lug 60 is integral with side frame bar 54.

As may be appreciated, the width of plate 50 is determined by the extent of expansion in step 16 (FIG. 1), while the height of the plate (which lies in the direction of travel of the alloy strip in the continuous process of the invention) is determined by the plate parting step 42. Simply by suitable adjustment, a family of grids and plates can be developed, characterized by a constant width and having a height selected to provide the desired capacity of an individual plate. In this fashion, the benefits of a continuous process are obtained; yet, flexibility is allowed so that change from one plate size to a different size can be readily effected.

Each of the process steps may be carried out by any equipment desired. Selection of the equipment and the source of the grid strip (e.g., directly cast, cast and then rolled or processed to the desired thickness) will depend on the process parameters considered necessary. As one example, in sealed cells, the alloys used generally do not include antimony (except for certain desirable cadmium-antimony lead-based alloys used for the positive plates where cycling issues are important) and the alloy composition used for the positive plate may or may not be the same. The thickness may also vary. Similarly, how the alloy strip is made may vary depending upon the alloy and thickness desired for the grids and plates.

As regards suitable plate dimensions, a typical thickness range may vary from about 0.100 inch to 0.250 inch for the positive plates and from about 0.08 inch to about 0.250 inch for the negative plates.

The plate widths can vary widely as can the height. Typical plate widths are about 5 to 6 inches, while the height in a plate family may vary from about 8 inches to about 28 inches.

A useful capacity range for a family of positive plates to satisfy various industrial battery applications can be from about 30 to 70 and 165 AH.

It should be appreciated that, while the continuous process of the present invention can be desirably utilized to produce side-by-side plates as in the illustrative embodiment, this invention can likewise utilize a strip to produce just one continuing line of plates. This may somewhat simplify the pasting and the plate parting steps. Of course, the production rate is effectively cut in half, which relative rate may even be more desirable where the plate volume required is limited in comparison to, for example, automotive applications.

Similarly, the order in which the various steps of the process of the present invention are carried out can be varied as desired, consistent with the objective of continuously providing the desired family of cell plates, with the plate height being disposed in the direction of travel of the processing sequence and being capable of being varied as desired.

The present invention is of substantial advantage in applications where VRLA cells and batteries are used, such as, for example, motive power and stationary power applications. However, and as previously discussed, it should be appreciated that the present invention is equally applicable to use in making plates for conventional flooded lead-acid cell and battery plates, and for automotive or for any application. Thus, the present invention should find advantageous use in any environment in which a family of plates, characterized by a constant width and varying height is needed.

The grids of the present invention thus are characterized by a process which provides a constant width, while allowing various grid sizes, accomplished simply by suitable adjustment of the process to provide the desired height of the grid. Such constant width grids with a variable grid height are thus amenable to use in a conventional family of lead-acid cells and batteries for industrial applications which achieve varying desired levels of electrical performance and capacity by varying the height of the individual grids and the number of plates used in a particular cell, retaining a constant width for the grid. Yet, the grids and plates of the present invention are amenable to continuous production, obviating the trouble and expense attendant with using gravity casting.

Figure 4:
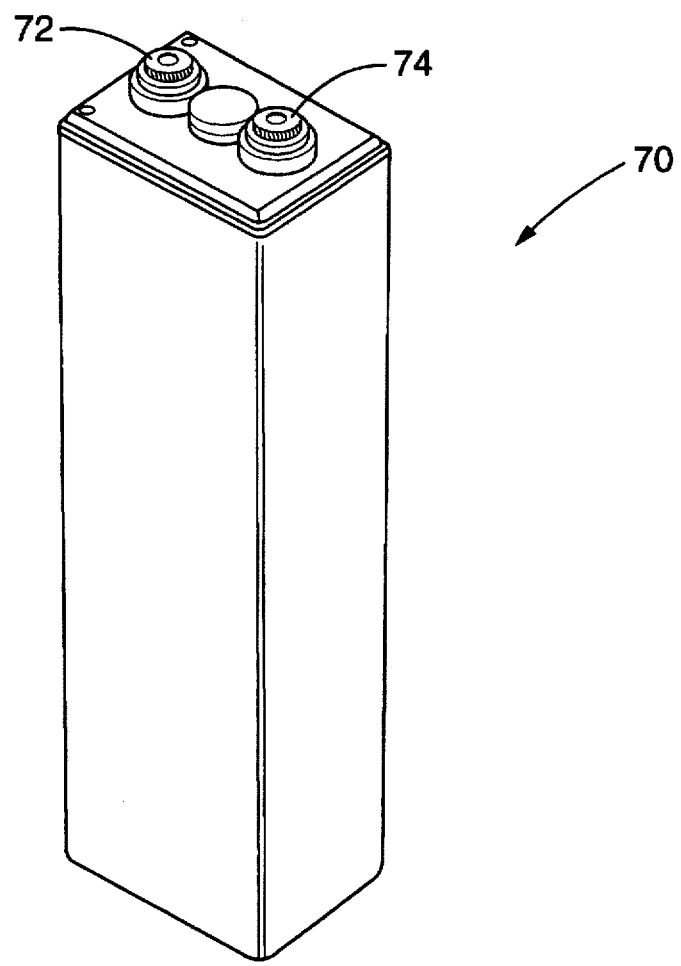
FIG. 4 is a perspective view of a lead-acid cell made using the grids and plates of this invention.

FIG. 4 shows an illustrative embodiment of a cell 70 made using the grids and plates of the present invention. Positive and negative terminals 72 and 74 comprise the requisite external terminals. The grids and plates of the present invention may be used with any particular cell construction or battery construction.

In addition to the substantial economies and simplicities derived from using continuous processing, it is believed that the side frame bar-mesh construction will provide desirable benefits in service. Further flexibility in design and construction is achieved by the simplicity of the design which requires only one side frame bar and an expanded mesh connected thereto. Yet, if desired, due to processing or end use considerations, the grid may comprise side frame bars with the expanded mesh connected therebetween.

Thus, as has been seen, the present invention provides a facile process for making lead-acid cell and battery grids on a continuous basis at commercially acceptable rates of production. The grids thus made find substantial utility in sealed lead-acid batteries and in other cells and batteries for industrial applications, obviating the need for making grids using gravity casting techniques which inevitably prove troublesome.

We claim:

1. A continuous method for making plates for lead-acid cells and batteries which comprises providing a continuous strip of a lead-based alloy, moving said alloy strip in a direction of travel while slitting and expanding said alloy strip to provide, in the direction of travel, at least one side frame bar strip and an expanded mesh integrally formed with said side frame bar strip, said side frame bar and expanded mesh defining the width of the plate, pasting the expanded mesh with an active material for lead-acid cells and batteries, transporting the pasted, expanded mesh strip to a plate parting station, and cutting the pasted, expanded mesh strip transversely of the direction of travel to provide plates of the preselected height while leaving one side frame bar with a longer dimension in the direction of travel so as to provide a plate lug.

2. The method of claim 1 wherein said expanded mesh has openings in the form of diamonds.

3. The method of claim 1 wherein the active material paste is cured.

4. The method of claim 1 wherein said lead-acid cells and batteries are sealed, valve-regulated lead-acid cells and batteries.

5. The method of claim 1 wherein said alloy strip is slit and expanded to provide two side frame bars with said expanded mesh being positioned therebetween.

6. A method of making plates for lead-acid cells and batteries in a continuous fashion which comprises providing a continuous lead-based alloy strip, moving the strip in a direction of travel while expanding and slitting the strip to provide a central frame bar strip intergrally interconnected with an expanded mesh, pasting the expanded mesh with active material for a lead-acid cell, cutting said center strip to provide an outside frame bar and side-by-side pasted, expanded mesh strips, moving the separated strips to a plate parting station, and cutting the separated strips transversely to the direction of travel to provide a plate of the preselected height while leaving said outside frame bar with a height to provide a lug for the plate.

7. The method of claim 6 wherein said expanded mesh has openings in the form of diamonds.

8. The method of claim 6 wherein the active material paste is cured.

9. The method of claim 6 wherein said lead-acid cells and batteries are sealed, valve-regulated lead-acid cells and batteries.

10. The method of claim 6 wherein the expanding and slitting provides two outside frame bars, the width of the central strip having a width greater than that of the two outside frame bars.

11. A method of making plates for sealed, valve-regulated lead-acid cells and batteries requiring a particular plate width and having plate heights of a varying dimension in a continuous method which comprises providing a continuous strip of a lead-based alloy, moving the strip in a direction of travel while cutting and slitting the strip to provide an expanded mesh strip having a width in a direction transverse to the direction of travel of the preselected plate width, the expanded mesh strip comprising at least one outside frame bar and an integral interconnected expanded mesh, pasting the expanded mesh strip with an active material for a sealed, valve-regulated lead-acid cell, determining the height for the plates, and cutting the expanded mesh strip transversely of the direction of travel to provide plates of the desired height while leaving one outside frame bar with a height so as to provide a plate lug.

12. The method of claim 11 in which the expanded mesh strip has two outside frame bars with the expanded mesh positioned between said frame bars.

* * * * *